Patented Aug. 18, 1942

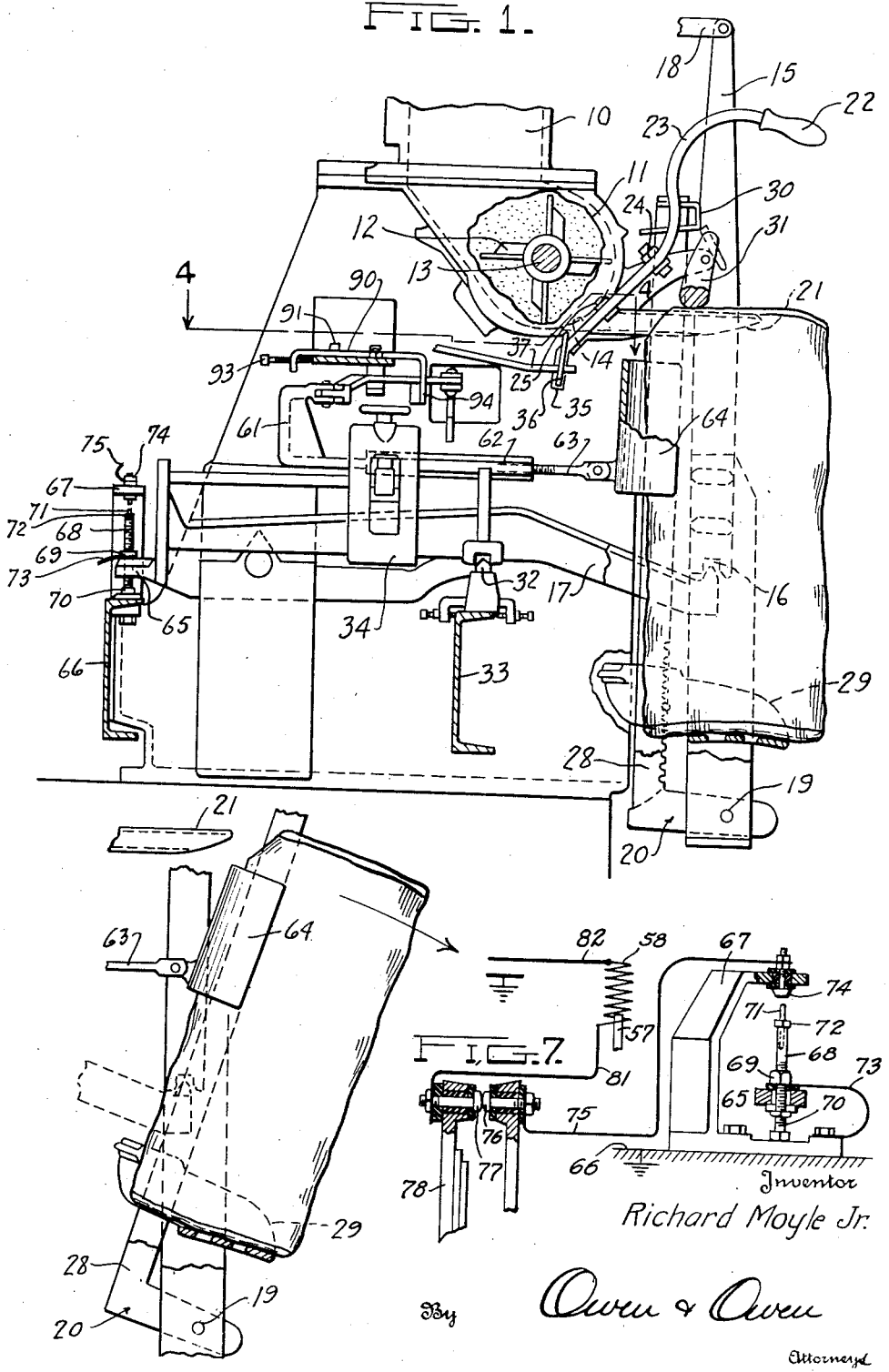

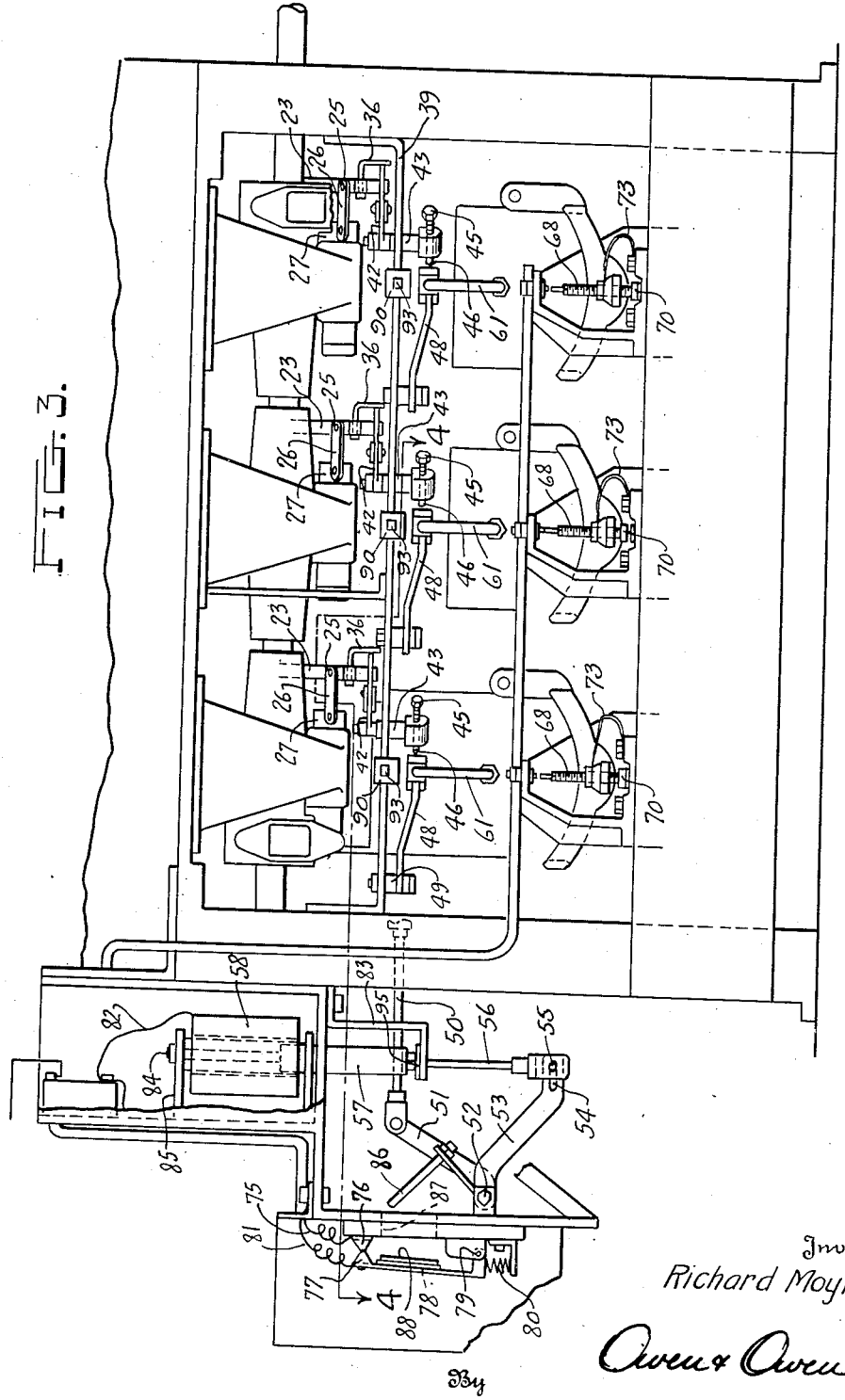

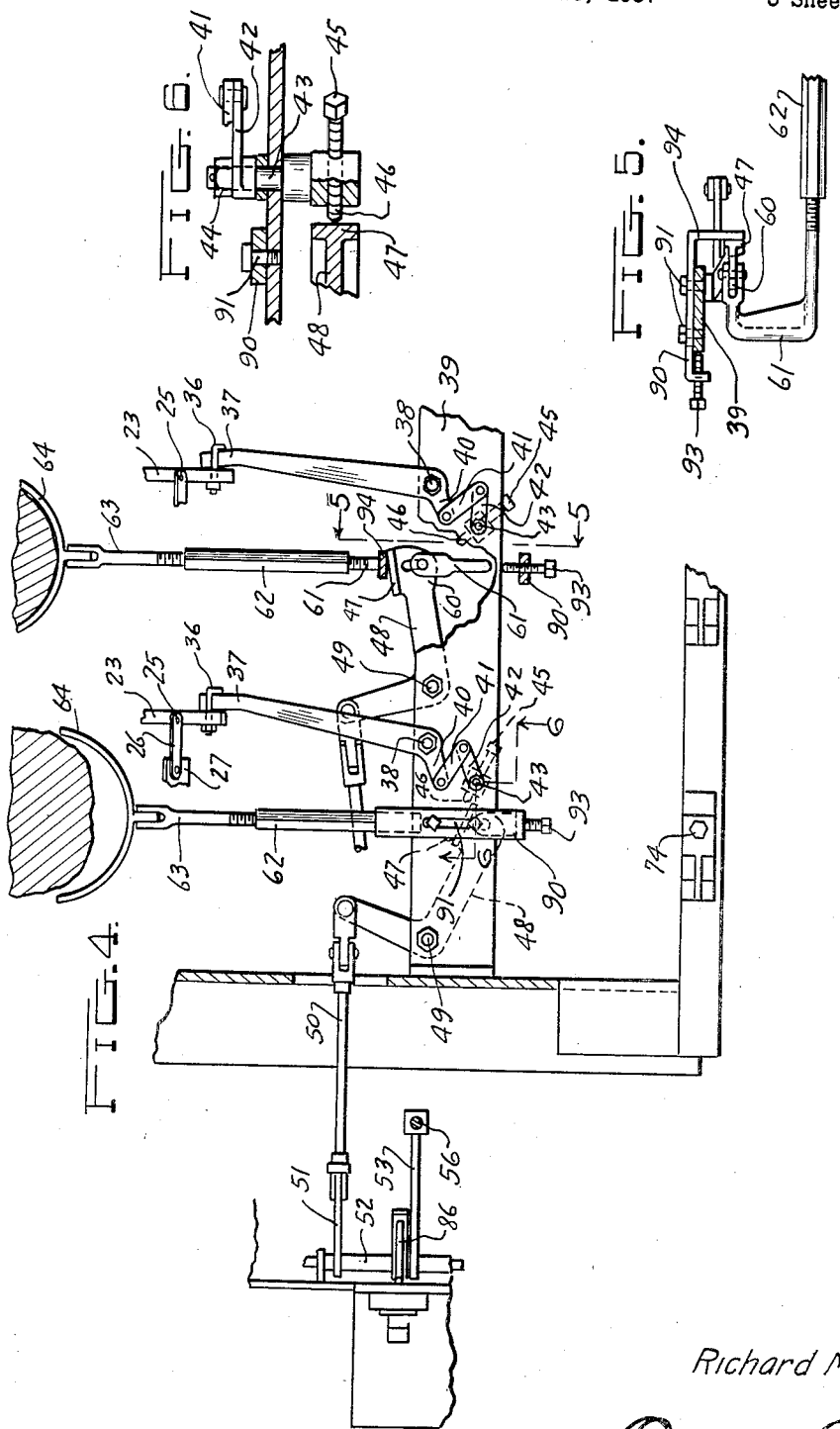

2,293,518

UNITED STATES PATENT OFFICE 2,293,518

BAG FILLING APPARATUS

Richard Moyle, Jr., Oglesby, Ill.

Application February 25, 1937, Serial No. 127,673

10 Claims. (Cl. 249—63)

This invention relates to an improvement in bag filling apparatus and more particularly to an improvement in cutting off the discharge and removing a bag from apparatus for filling valve bags.

An object of the invention is to cut off discharge of material into a bag, in apparatus of the type where the bag is placed upon weighing mechanism during the filling operation, immediately upon the first response of the weighing apparatus to the weight of the bag.

A further object is to automatically discharge the filled bag from the apparatus immediately after the discharge into the bag has stopped.

Other objects and details of the invention will appear as the description proceeds.

In the accompanying drawings forming a part of this specification, Figure 1 is a side elevation, partly in section, of one form of apparatus embodying my invention; Fig. 2 is a detail view showing the apparatus in bag-discharging position; Fig. 3 is a rear view of the apparatus shown in Fig. 1; Fig. 4 is a partial sectional plan on the line 4—4 of Fig. 3; Figs. 5 and 6 are detail sections on the line 5—5 and 6—6, respectively, on Fig. 4; and Fig. 7 is a somewhat diagrammatic drawing showing the wiring connections by which the solenoid is operated.

In the apparatus shown in the drawings, my invention is applied to a bag filling machine commonly used in cement plants at the present time, and corresponding approximately to the apparatus disclosed in patents to Adelmer M. Bates, No. 1,138,618, May 11, 1915, and No. 1,209,105, December 19, 1916. Such apparatus comprises a hopper 10 from which material is fed downward into a housing 11 containing a propeller 12 mounted upon a shaft 13 and discharging material through an opening 14. In front of this opening there is mounted a frame 15 pivoted at 16 upon the ends of scale beam 17. The frame 15 is maintained in upright position by a link 18 attached to the top end and to hopper 10 at a point not shown.

Pivoted at 19 upon the lower end of frame 15 there is a cradle 20, and mounted upon frame 15 at approximately the level of opening 14, there is a discharge spout 21 adapted to enter the valve of a valve bag. Also, mounted upon frame 15, there is a handle 22 at one end of a lever 23 fulcrumed at 24 and extending downward therebeyond. At 25 there is connected to the lever a link 26 which operates a gate 27 having an opening therethrough so that, when it is in one position, it allows material to be discharged through opening 14 into the discharge spout 21, while in another position, the gate closes the outer end of opening 14 and prevents discharge of material. Cradle 20 comprises uprights 28 which carry a bottom support 29 for a bag, and which also carry at their upper end a trip 30 adapted to release a clamp 31 mounted upon frame 15 and adapted to clamp a bag upon filling spout 21.

Scale beams 17 are pivoted at 32 upon a frame 33 and carry weights 34 which may be adjusted to counterbalance the desired weight so that the left end of the beam, as viewed in Figure 1, will be raised when a predetermined amount of material is fed into a bag which is in the sealing position upon spout 21.

The apparatus as thus far described is all a part of the machine customarily employed for filling cement bags and constitutes no part of this invention except as the apparatus cooperates with the present invention produce the desired results.

The lower end of the gate lever is extended downward at 35 and is provided with a keeper 36 between which and the lower end of the lever there is provided a slot in which the end 37 of a gate-operating lever works. This lever is mounted at 38 upon a plate 39 supported horizontally upon the frame of the machine in any desired manner. Beyond fulcrum 38, the lever is provided with an arm 40 connected by a link 41 with an arm 42 attached to the upper end of a rock shaft 43. This rock shaft is preferably constructed of an upper and lower part threaded together, so that they may be rotated with respect to each other, and provided with a lock nut 44 by which they are locked in adjusted relation. Through the lower end of compound rock shaft 43 there is a threaded arm 45 provided with a hardened point 46 adapted to be contacted at suitable intervals by a hardened plate 47 upon a bell crank lever 48 pivoted at 49 on plate 39. The other arm of bell crank lever 48 is connected through a jointed rod 50 to the upper arm 51 of a bell crank lever fulcrumed at 52, the other arm 53 of which is provided with a slot 54 in which there works a pin 55 attached to the lower end of a rod 56 extending downward from the core 57 of a solenoid 58. Bell crank lever 48 is also provided with an ear 60 connected by a lost motion connection with the rear end 61 of a push member which is in turn connected by a turn buckle 62 with a rod 63 upon which there is mounted a discharge member 64.

The rear end 65 of the scale beam extends above frame member 66 and below a keeper 67. In the form of device shown, the frame of the scale is grounded in any suitable manner. The rear end 65 of the scale beam is provided with a vertically adjustable set screw 68 which may be locked in adjusted position by a nut 69. The head 70 of this screw acts as a stop limiting the downward movement of the rear end of the scale beam. The screw is hollow at its upper end and has threaded therein a contact screw 71 which may be locked in adjusted position by a lock nut 72. An electric wire 73 is connected to screw 68 and frame 66 so as to maintain a good electrical connection between these members. A suitably insulated contact 74 is mounted in keeper 67 in position to be contacted by member 71 when the rear end of the scale beam moves upward. Contact 74 is connected by suitable connections 75 with an insulated contact 76 mounted adjacent the solenoid coil 58. An insulated contact member 77 is mounted upon an arm 78 pivoted at 79 and normally urged by a spring 80 into contact with member 76. Contact 77 is connected by suitable connections 81 with the one end of the solenoid coil, the other end 82 of the solenoid coil being suitably connected to a power line.

In the construction shown, the solenoid rod 56 is guided by a bracket 83 and the upper end of core 57 has extending upward therefrom a brass rod 84 which is guided by a bracket 85 so that the core is maintained in true alignment with the solenoid.

Mounted upon bell crank arm 51, there is an abutment member 86 in position to move through a slot 87 into contact with a hardened plate 88 on arm 78, the end of member 86 also being properly hardened.

The operation of the apparatus thus far described is substantially as follows:

A bag is placed with its valve over the filling spout 21 and is clamped in place by clamp 31 in the usual manner. Thereafter, the operator moves handle 22 in the usual manner to move gate 27 into open position and material is discharged into the bag, or as has been customary. As soon as sufficient material has been discharged into the bag to lower the front end of the scale beam and raise the rear end thereof so that contacts 71 and 74 are engaged, circuit is completed through these contacts and through contacts 76 and 77 to the solenoid so that the solenoid is energized and core 57 is raised. Thereupon, arms 51 and 53 are moved to pull link 50 to the left, as viewed in Figs. 2 and 3 and move arm 48 forward. Hardened plate 47 thereupon contacts the hardened end 46 of screw 45 and rocks compound shaft 43 which in turn rocks arm 37 and thereby moves the gate 27 to closed position.

Just before the gate is closed, the play in lost motion connection 60 is taken up and member 61 is moved forward. Normally there is some space between discharge pusher 64 and the filled bag, the first movement of the pusher moves it upward into contact with the bag and at the same time member 30 is moved forward so as to release clamp 31. The parts are so proportioned that ordinarily the clamp is released immediately after the closing of the gate and pusher 64 contacts the bag so as to start moving the bag just as the clamp is released. Continued movement of the pusher shoves the bag off of the filling tube and tilts the bag carrier about pivot 19 and so discharges the bag from the frame.

During the upward movement of core 57, member 86 contacts plate 88 and moves contact 77 away from contact 76, thereby breaking the circuit through the solenoid. However, the movement of the parts continues thereafter until the bag is completely discharged. Residual magnetism and momentum of the parts contribute to this continued movement, and it will be seen from Fig. 2 that the center of gravity of the filled bag passes to the right of pivot 19 and continues the discharging movement of the bag. As will be seen from the same figure, the center of gravity of empty cradle 20 and associated parts is to the left of pivot 19 and aids in the return of the parts to their original position after the cradle is relieved of the weight of the bag.

Upon plate 39 there is mounted an adjustable bracket 90 through a pin and slot connection 91. The rear end of bracket 90 is turned downward and an adjusting screw 93 is threaded through this downward turned end and bears against the rear side of plate 39 and so draws the bracket back to the desired extent. The front end of the bracket is turned downward also and carries a cushioning block 94 in position to be contacted when member 61 reaches its full discharging position. Block 94 thus stops the discharging movement of the members and cushions the shock at the end of this movement. It also is preferably resilient and aids the gravity of the member 57 in starting the parts back towards their initial position. A resilient block 95 may be mounted on bracket 83 around rod 56 so as to cushion the jar when the solenoid core drops.

In the construction shown, there are indicated three similar filling machines arranged side by side. This is convenient, since an operative can attend to three or more filling machines. The several units are all alike, so that the description of one applies to all. In practice, bags are placed upon the filling spouts in succession, so that while a bag is being filled on one unit, a bag is being discharged from another unit, as indicated in Fig. 4, and an empty bag is being placed upon the third unit. The number of units thus placed side by side and operated together is not limited to three, as any number may be thus arranged and operated in accordance with what is found convenient and desirable under the circumstances of a particular case.

It will be readily understood that various changes may be made in the electrical connections and in the mechanical connections in accordance with the requirements of varying installations, the embodiment disclosed in the drawings and described above being by way of illustration and not of limitation. The amount of movement allowed the scale beam may be varied, if desired, by suitable adjustment, but is preferably small. More accurate and uniform weights may be obtained by insuring the cut-off of the discharge as promptly as possible after a weight is received sufficient to start the scale beam, as this eliminates variations in the amount discharged after the weighed amount has been received. Accordingly, it is preferable to have contacts 71 and 74 comparatively close together at the beginning of the weighing operation. One-eighth or three-sixteenths of an inch is a sufficient gap under ordinary circumstances to provide for the dislodgment of dust and secure a good make and break. A smaller gap may be employed if precautions are taken to prevent the contact from being impaired by dust. It will be readily understood that this movement is much less than that ordinarily required for effecting the closing of the discharge gate. The action of the solenoid after contact is made is substantially instantaneous and so very prompt closing action is obtained. Also, the closing action results uniformly after the charge in the bag reaches such a weight that the scale beam begins to move. This results in increasing the accuracy of the charges over what could be obtained by hand closing of the gate or automatic closing which was delayed.

Also, there is an advantage in the automatic and prompt discharge of the bag from the filling tube after the filling is completed. In the normal operation of apparatus of this type there is considerable air discharged into the bag along with the cement and at the completion of the filling operation, the bag is blown up with this air and a mixture of air and cement at the top of the bag is under greater than atmospheric pressure. The result is that as soon as the filling operation ceases, there is back pressure and if the bag remains on the tube, cement and air are blown together back through the tube and out of every small crevice. When the disclosed improvement is utilized, the bag is discharged from the filling tube immediately after the completion of the filling operation and as the bag drops from the tube, the valve is closed so that it prevents the discharge of the air and cement and allows only the slow seepage of the air alone until equilibrium of pressure has been restored. For this reason, the automatic discharge of the bag prevents the waste of cement blown out of the valve after the filling operation is completed and avoids irregularities in that amount of waste so that increasing accuracy of weight is obtained.

Therefore, it will be seen that in the construction disclosed, there is a marked improvement in the uniformity of weights of successive bags as well as a distinct saving in the operations required of the attendant.

While the electric operation of the closing gate is preferred, it will be understood that a similar device might be used where a spring or like means is employed for closing the gate and the electric means merely trips the spring, and then continues to discharge the bag.

The parts are constructed so that member 86 breaks the circuit through the solenoid before core 57 has reached its uppermost position and before the bag is fully discharged. The momentum of the parts normally completes the upward travel of the core and the discharging operation. If for any reason the first upward movement of core 57 does not complete the discharge, the weight of the bag maintains the contact between 71 and 74, so that the solenoid is again energized as soon as the member 86 permits the closing of the circuit through 76 and 77. This results in another kick by the discharging apparatus, which is automatically repeated until the scale beam is relieved of its load.

Normally, the bag is discharged on the first kick, and by the time contacts 76 and 77 reengage the circuit is open because of the separation of contacts 71 and 75. Thus the solenoid is energized for only a brief time under normal conditions; but the energization is automatically repeated if the discharge of the bag is not completed, and is not repeated after the discharge of the bag.

The solenoids are all arranged at the end of the bank of filling machines, and both the gate-closing and bag-discharging apparatus is arranged above the scale beam but behind the bag support, so that it does not interfere in any way with the access to the front of the machine. The connection of contact 71 directly to the grounded frame of the machine by-passes the pivotal mounting of the scale beam, which insures a better contact and at the same time avoids a deleterious effect on the knife-edge bearings.

While a satisfactory embodiment of the invention has been described in considerable detail, and a number of the details of construction are of considerable advantage, it will be understood that various changes in the arrangement of parts and connections, and other modifications of the apparatus may be made within the scope of the appended claims.

What I claim is:

1. Valve bag filling apparatus comprising a propeller in a housing having a discharge port, a gate for closing the port, a spout adapted to enter the valve of a bag and mounted in position to receive material from the port, weighing means for supporting the spout and a bag thereon, electric power means, connections energizing the electric means upon movement of the weighing means in response to the weight of material in a bag being filled, and means actuated by said electric means for closing the gate and forcibly discharging the filled bag from the spout and weighing device.

2. Apparatus in accordance with claim 1, and having means to insure the closing of the gate before bag-discharge is effected.

3. Apparatus in accordance with claim 1, and comprising a reciprocable member the initial movement of which effects the closing of the gate and further movement of which effects the discharge of the bag.

4. Valve bag filling apparatus comprising a hopper having a port and a gate for closing the port, a spout adapted to enter the valve of a bag and mounted to receive material from the port, weighing means for supporting the spout and a bag thereon, a solenoid energized by movement of the weighing means in response to the weight of material in a bag being filled, and means actuated by the solenoid for first insuring the closing of the gate and then discharging the filled bag from the spout and weighing means.

5. Apparatus in accordance with claim 4, and comprising means breaking the circuit through the solenoid before the discharge of the bag is completed.

6. Apparatus in accordance with claim 4, and the solenoid having a core with a guide rod extending from each end thereof and guides for the rod, whereby the core is guided in close proximity to the coil without frictional contact.

7. Apparatus for filling valve bags comprising a spout adapted to enter the valve of a bag, discharge apparatus having a port adapted to discharge into the spout and a horizontally movable gate for closing the port, a scale beam, a support mounted on the forward end of the beam for supporting a bag being filled by the spout, a lever approximately parallel with the beam and above the beam and below the spout and having its forward end operatively connected to the gate, power means acting upon the rear end of the lever to actuate it horizontally in gate-closing direction, and means energizing said power means upon upward movement of the rear end of said beam.

8. Apparatus for filling receptacles comprising weighing means for supporting a receptacle in position to be filled, a gate controlling discharge of material into a receptacle supported on the weighing device, a push rod for discharging a filled receptacle from the weighing device, an operating member having lost motion connection with the push rod, means actuating the operating member upon movement of the weighing device in response to the weight of material in a receptacle thereon, and means actuated by the operating member during its lost motion movement for closing the gate.

9. Apparatus in accordance with claim 8, and in which the means actuating the operating member is a solenoid.

10. Apparatus in accordance with claim 8, in which the means actuating the operating member is a solenoid and comprising means breaking the circuit through the solenoid before the discharging movement of the push rod is completed.

RICHARD MOYLE, Jr.